United States Patent [19]

Nakayama et al.

[11] 3,999,894
[45] Dec. 28, 1976

[54] COMPRESSOR ASSEMBLY

[75] Inventors: Shozo Nakayama; Kimio Kato; Mitsuhiro Hattori, all of Kariya, Japan

[73] Assignee: Kabushiki Kaisha Toyoda Jidoshokki Seisakusho, Japan

[22] Filed: Nov. 10, 1975

[21] Appl. No.: 630,262

Related U.S. Application Data

[63] Continuation of Ser. No. 460,966, April 15, 1974, abandoned.

[30] Foreign Application Priority Data

Apr. 23, 1973 Japan .............................. 48-46001

[52] U.S. Cl. ................................ 417/269; 92/128; 92/162 R; 92/248; 277/26; 277/177
[51] Int. Cl.² .......................... F04B 1/16; F16J 9/20
[58] Field of Search ............ 417/269; 92/249, 248, 92/162, 172, 128; 277/26, 177, 173

[56] References Cited

UNITED STATES PATENTS

| 3,057,545 | 10/1962 | Ransom et al. ................... 417/269 |
| 3,145,629 | 8/1964 | Gottzmann .................... 417/901 X |
| 3,588,125 | 6/1971 | Mastromatteo .................... 277/26 |
| 3,600,045 | 8/1971 | Inoue ............................. 277/26 X |
| 3,675,738 | 7/1972 | Bush ............................. 277/26 X |
| R27,350 | 5/1972 | Jaeger ............................. 277/26 |

Primary Examiner—Irwin C. Cohen
Attorney, Agent, or Firm—Paul & Paul

[57] ABSTRACT

A reciprocating piston assembly for a compressor is disclosed in that a piston with at least one groove formed in its outer surface is slidably mounted in a cylinder bore and at least one piston ring made of polymers of fluorine-containing olefin monomers, the outer diameter of said piston ring being smaller than the diameter of said cylinder bore prior to operation of the compressor but said piston ring being in contact with the inner wall defining said cylinder bore during operation of the compressor.

3 Claims, 4 Drawing Figures

COMPRESSOR ASSEMBLY

This is a continuation, of application Ser. No. 460,966, filed Apr. 15, 1974, now abandoned.

DESCRIPTION OF THE INVENTION

The present invention relates to a compressor and particularly relates to a piston assembly of a swash plate type compressor for use in an air conditioning system for vehicles and the like.

A compressor piston is designed by taking into consideration the influence of heat which is produced during operation of the compressor, particularly heat produced by the reciprocating movement of the piston, and also, by taking into consideration the sliding friction resistance between the piston and the cylinder of the compressor, whereby the relative diameter of the piston to that of the cylinder is decided.

However, when the piston is made of material different from that of the cylinder, the heat characteristic of the piston is correspondingly different from that of the cylinder and thus, it is usually impossible to maintain constantly a high degree of airtightness which is required between the piston and the cylinder during operation of the compressor. Therefore, it is conventional to provide a piston with piston rings to maintain a constant and high degree of airtightness.

In a conventional piston assembly, the piston ring is made of cast iron. However, when assembling the compressor, a special aid tool is required to insert the conventional piston into the cylinder, since said iron piston ring has an outer diameter which is larger than the diameter of the inner wall of the cylinder bore before assembling the piston ring so that the piston ring comes into airtight contact with said inner wall owing to the outwardly expanding resilient force of said piston ring after assembly. As a result, insertion of the piston involves much time and trouble. Further, when the piston is inserted into the cylinder of, for example, the swash plate type compressor, the special aid tool for insertion cannot be used. Therefore, as shown in FIG. 4 which shows a conventional compressor, a tapered portion 5a is formed at the end portion of a cylinder bore 5 so that a piston 13 can be inserted into the cylinder 5 while a cast iron piston ring 14a of the piston 13 gradually shrinks to fit said tapered portion 5a. However, there are disadvantages to this method of inserting the piston 13 into the cylinder 5 in that it requires time and trouble, and the machining process for such a cylinder becomes more complicated due to the additional machining required to form the tapered portion. Further disadvantages are that it is necessary to increase the thickness of a cylinder block for forming said tapered portion, thus increasing the size of the compressor and thereby, running counter to reduction of costs.

One of the primary objects of the present invention is to provide a reciprocating piston assembly by which the above disadvantages can be eliminated.

Another primary object of the present invention is to provide a reciprocating piston assembly which contributes to airtightness by the use of a piston ring.

Still another primary object of the present invention is to provide a reciprocating piston assembly which can be easily inserted into the cylinder.

In accordance with the present invention, a reciprocating piston assembly for a compressor comprises:

a piston with at least one groove formed in its outer surface, slidably mounted in a cylinder bore, at least one piston ring fitted to said groove and made of a polymers of fluorine-containing olefin monomers, the outer diameter of said piston ring being smaller than the diameter of said cylinder bore prior to operation of the compressor but said piston ring being in contact with the inner wall defining said cylinder bore during operation of the compressor.

These and other objects and features of the present invention will become apparent from the following description with reference to the accompanying drawings.

DESCRIPTION OF THE PREFERRED EMBODIMENT

Figure 1:
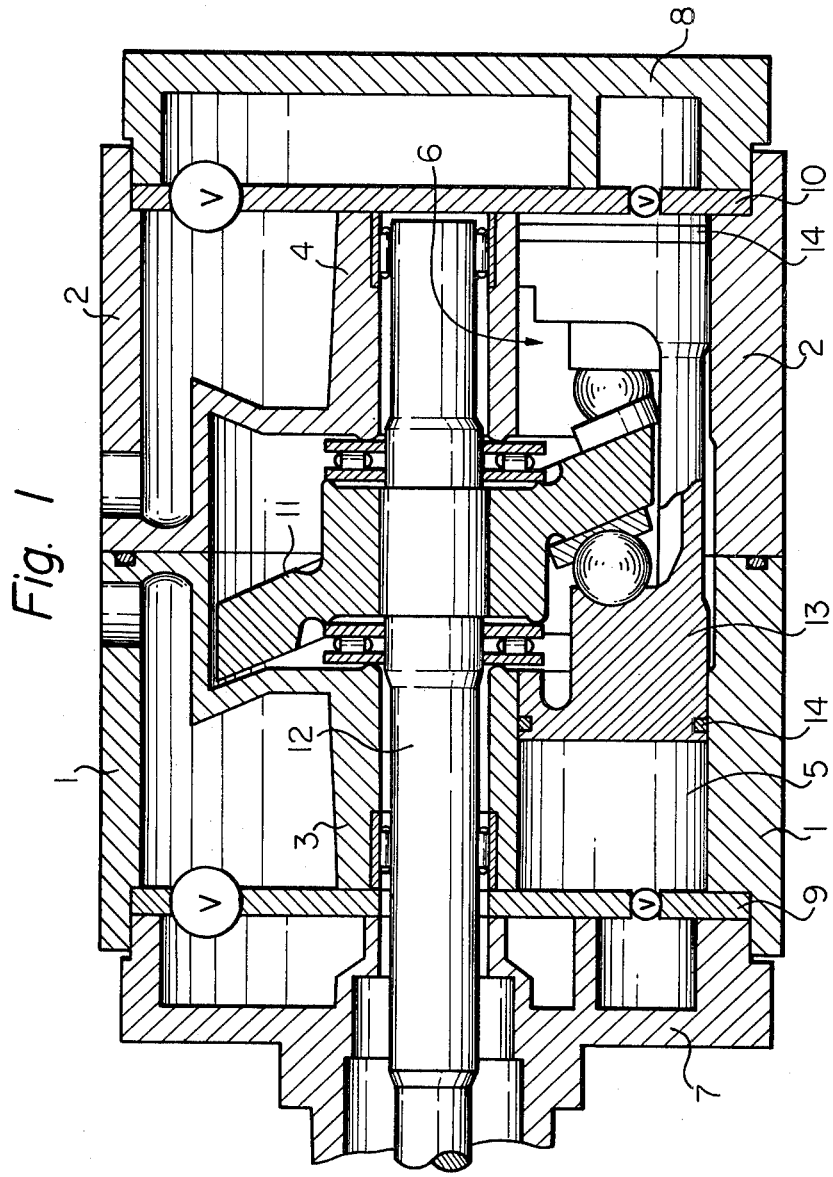
FIG. 1 is a cross sectional view of the swash plate type compressor according to the present invention.
Figure 2:
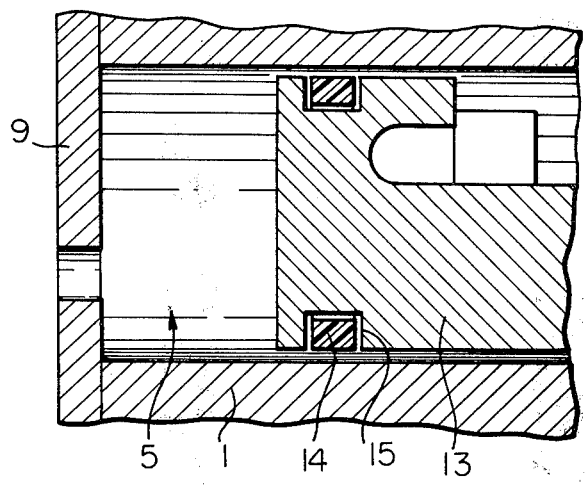
FIG. 2 is an enlarged partial sectional view of the compressor shown in FIG. 1 prior to operation of the compressor.
Figure 3:
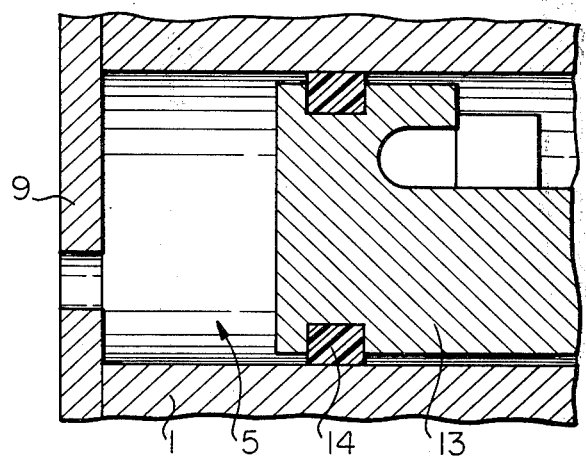
FIG. 3 is an enlarged partial sectional view of the compressor shown in FIG. 1 during operation of the compressor.
Figure 4:
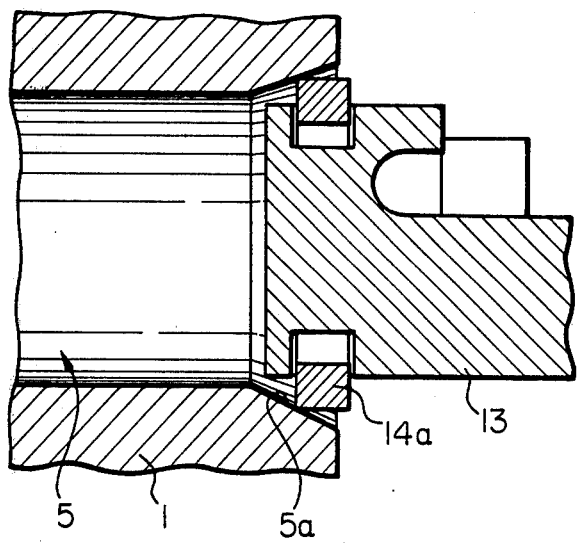
FIG. 4 is also an enlarged partial sectional view of a conventional compressor during assembly.

Referring to FIGS. 1, 2 and 3, reference numerals 1 and 2 designate cylinder blocks respectively having several cylinder bores 5 and 6 which are radially arranged around bearing portions 3 and 4. References 7 and 8 designate front and rear housing, respectively. References 9 and 10 designate valve plates, each of which is provided with both an intake valve and an exhaust valve and each is supported between cylinder block 1 and front housing 7 or between cylinder block 2 and rear housing 8. A swash plate 11 is fixed to an axle 12 and is mounted rotatably in the cylinder blocks 1 and 2. Piston 13 is disposed in the cylinder bores 5 and 6 and is reciprocated by means of the rotation of the swash plate 11. Piston rings 14 are fitted to grooves 15 which are formed in the outer surface of piston 13, near the top of the piston. Said piston rings 14 are made of polymers of fluorine-containing olefin monomers. These polymers may be Homopolymers or Copolymers predominantly comprised of fluorine-containing monomers. Such polymers include tetrafluoroethylene, trifluoroethylene, trifluorochloroethylene, vinylidenefluoride and hexafluoropropylene. The outer diameter of piston ring 14, before attachment to piston 13, is formed smaller than the diameters of the cylinder bores 5 and 6 in which piston 13 is slidably inserted. FIG. 2 shows the configuration of piston rings 14 when piston 13 is inserted into the cylinder bores 5 and 6 in order to assemble the compressor, and also when the compressor is not operating. In both cases, it is understood that piston rings 14 are out of contact with the inner wall defining the cylinder bores 5 and 6 and consequently, do not maintain airtightness. The groove 15 and the piston ring 14 are both rectangular cross section. The depth and width of the groove 15 are selected such that when piston 13 is inserted into cylinder bores 5 and 6 in order to assemble the compressor, the outer diameter of piston ring 14 fitted into the groove 15 is smaller than the diameter of the cylinder bores 5 and 6. Further, piston ring 14 may be either of the cut type or the endless type. When piston ring 14 is of the endless type, this endless piston ring can be fitted to the groove 15 of piston 13 by means of an apparatus having a tapered portion, thus allowing the diameter of said piston ring to gradually expand due to its elasticity.

When piston 13 which is provided with piston ring 14 made of the aforementioned polymers and having the aforementioned specified outer diameter, is inserted into the cylinder bores 5 and 6 in order to assemble the compressor, piston 13 can be easily inserted without using the aforementioned special aid tool for insertion, since the outer diameter of the piston ring 14 is smaller than the diameter of the cylinder bores 5 and 6. Consequently, the work of inserting the piston requires relatively little time and no trouble.

As shown in FIG. 2, groove 15 of the piston 13 is formed such that when piston 13 is inserted into the cylinder bore in order to assemble the compressor, the depth of the groove 15 is greater than the thickness of the piston ring 14 and also, the width of the groove 15 is greater than the width of the piston ring 14. However, when the compressor is operated, heat produced by the sliding friction between piston 13 and cylinder bores 5 and 6 and also, by the adiabatic compression caused by the reciprocating action of the piston 13, is transferred to piston ring 14, thus expanding piston ring 14 to completely fill the groove 15. And since the piston ring 14, made of the aforementioned polymers has a considerably high coefficient of thermal expansion compared with the iron piston ring, it contacts the inner surface defining the cylinder bores 5 and 6, as shown in FIG. 3. Consequently, an appropriate airtightness can be ensured. When the endless type is used as the piston ring 14, airtightness can be further ensured.

During operation of the compressor, particularly the compressor for use in an air conditioning system for vehicles, the temperature of piston 13 and the inner walls defining the cylinder bores 5 and 6 attains, at most, 100° C. The maximum allowable temperature of the piston ring 14 made of polytetrafluoroethylene is about 250° C. Consequently, this type of piston ring is satisfactorily applicable as the piston ring for this compressor.

By virtue of the properties of the piston ring material, the piston ring is easily slidable, the operation of this piston ring requires no lubrication. Further, it should be appreciated that wear-resistance of the piston ring can be greatly improved by adding other materials such as carbon, graphite and glass fiber to the aforementioned polymers.

Moreover, it is understood that according to the piston assembly of the present invention, the airtightness obtained by use of said piston ring can be adjustable so as to ensure the appropriate airtightness in accordance with the load of the compressor.

This adjustment of airtightness can be achieved by providing an appropriate distance between the inner surface of said piston ring and the bottom surface of the groove of the piston before assembling the piston into the cylinder, since in this kind of compressor it is very difficult to change the diameter of the cylinder bore. In the case of providing a relatively small distance between said inner surface of the piston ring and said bottom surface of the groove, when expanding said ring to completely fill the groove and also to put it into contact with the inner wall defining the cylinder bore, airtightness is greatly increased, and therefore the volumetric efficiency of the compressor is increased, but wear-resistance on the piston ring is decreased. On the contrary, in the case of providing a relatively large distance between said inner surface and said bottom surface, airtightness is decreased, and therefore wear-resistance on the piston ring is increased, but the volumetric efficiency of the compressor is decreased. Consequently, an appropriate airtightness can be obtained by providing a distance which is centered between the above two extreme distances, between said inner surface and said bottom surface prior to assembly of the compressor. It should be appreciated that such establishment of the appropriate airtightness enables the compressor to maintain good volumetric efficiency in spite of the variation of load to the compressor. If the load is heavy, the outwardly expanding force of the piston ring caused by the relatively high temperature according to the heavy load is large, causing the appropriate airtightness. If the range of the load is light, the appropriate airtightness can also be obtained by the relatively small outwardly expanding force of the piston ring caused by the relatively low temperature according to the light load.

The advantages of the present invention include relatively little time and no difficulty in assembling the compressor and simplified construction as compared with a conventional compressor, thereby resulting in a compact compressor. Further, during operation of the compressor, appropriate airtightness can be maintained.

While the invention has been described with reference to a specific embodiment chosen for purposes of illustrations, it should be apparent that numerous changes could be made and accordingly, it is intended that the invention be limited only by the semantics of the following claims.

What is claimed is:
1. A compressor for use in an air conditioning system, comprising:
    a pair of axially aligned cylinder blocks, each having a cylinder bore therein,
    a valve plate mounted at the distal end of each cylinder block, having an exhaust and an intake valve formed therein,
    a housing enclosing each valve plate in sealing relationship with said cylinder bores,
    an axle rotatably mounted axially of said cylinder bores, valve plates and housings,
    a swash plate secured to said axle for rotation therewith,
    a double acting piston slidably, reciprocably mounted within said bore of said cylinders and being actuated by said swash plate for effecting a compressing action, said piston being formed in one piece and having an annular groove in the periphery thereof having a rectangular cross section, a piston ring seal fitted into said groove and having a rectangular cross section, said piston being made of fluorine-containing olefin polymer having a higher coefficient of thermal expansion than that of said cylinder block and said piston, the outer diameter of said piston ring seal being smaller than the diameter of said cylinder bore and also the thickness and the width of said piston ring seal being respectively smaller than the depth and the width of said groove at ambient temperature, whereby said piston ring seal expands in all directions so as to completely fill said groove and be in contact with the inner wall defining said cylinder bore during normal operation of the compressor.

2. A compressor as recited in claim 1, wherein said piston ring seal has a cut at a position on its circumference.

3. A compressor as recited in claim 1, wherein said piston ring seal is an endless piston ring seal.

* * * * *